United States Patent [19]
Yu

[11] Patent Number: 5,838,784
[45] Date of Patent: Nov. 17, 1998

[54] ONE-TOUCH DIALING APPARATUS AND METHOD FOR REGISTERING DIALING NUMBERS IN A TELEPHONE SYSTEM

[75] Inventor: Yun-Kyung Yu, Incheon, Rep. of Korea

[73] Assignee: Daewoo Telecom Ltd., Incheon, Rep. of Korea

[21] Appl. No.: 704,191

[22] Filed: Aug. 28, 1996

[30] Foreign Application Priority Data

Aug. 28, 1995 [KR] Rep. of Korea ............... 95-26985

[51] Int. Cl.⁶ .................................................. H04M 1/56
[52] U.S. Cl. ......................... 379/356; 379/156; 379/159; 379/160; 379/216; 379/355
[58] Field of Search ..................... 329/67, 88, 110.01, 329/111, 201, 216, 350, 352, 354, 355; 379/356, 337, 359, 156, 165, 159, 160; 455/73, 550, 564

[56] References Cited

U.S. PATENT DOCUMENTS

| | | | |
|---|---|---|---|
| 5,054,058 | 10/1991 | Kakizawa | 379/157 |
| 5,119,414 | 6/1992 | Izumi | 379/157 |
| 5,245,653 | 9/1993 | Izumi | 379/157 |
| 5,392,340 | 2/1995 | Otsuka | 379/201 |
| 5,430,791 | 7/1995 | Feit et al. | 379/216 |
| 5,469,501 | 11/1995 | Otsuka | 379/201 |
| 5,509,000 | 4/1996 | Oberlander | 370/409 |
| 5,557,665 | 9/1996 | Yamamoto | 379/198 |
| 5,568,546 | 10/1996 | Marutiak | 379/355 |

*Primary Examiner*—Ahmad F. Matar
*Assistant Examiner*—Scott Wolinsky
*Attorney, Agent, or Firm*—Pennie & Edmonds LLP

[57] ABSTRACT

A one-touch dial apparatus and method for registering dialing numbers in a telephone system includes a memory module divided into a plurality of memory blocks, each memory block having a number of memory locations, wherein each of the memory blocks is arranged for each of the corresponding telephones. When an intercom number for a subject telephone is generated from a source telephone, a memory block corresponding to the subject telephone having the intercom number is selected and each of the memory locations in the selected memory block is addressed sequentially. And then, a memory button is assigned to an addressed memory location and a dialing number is registered into the addressed memory location assigned to the memory button.

16 Claims, 7 Drawing Sheets

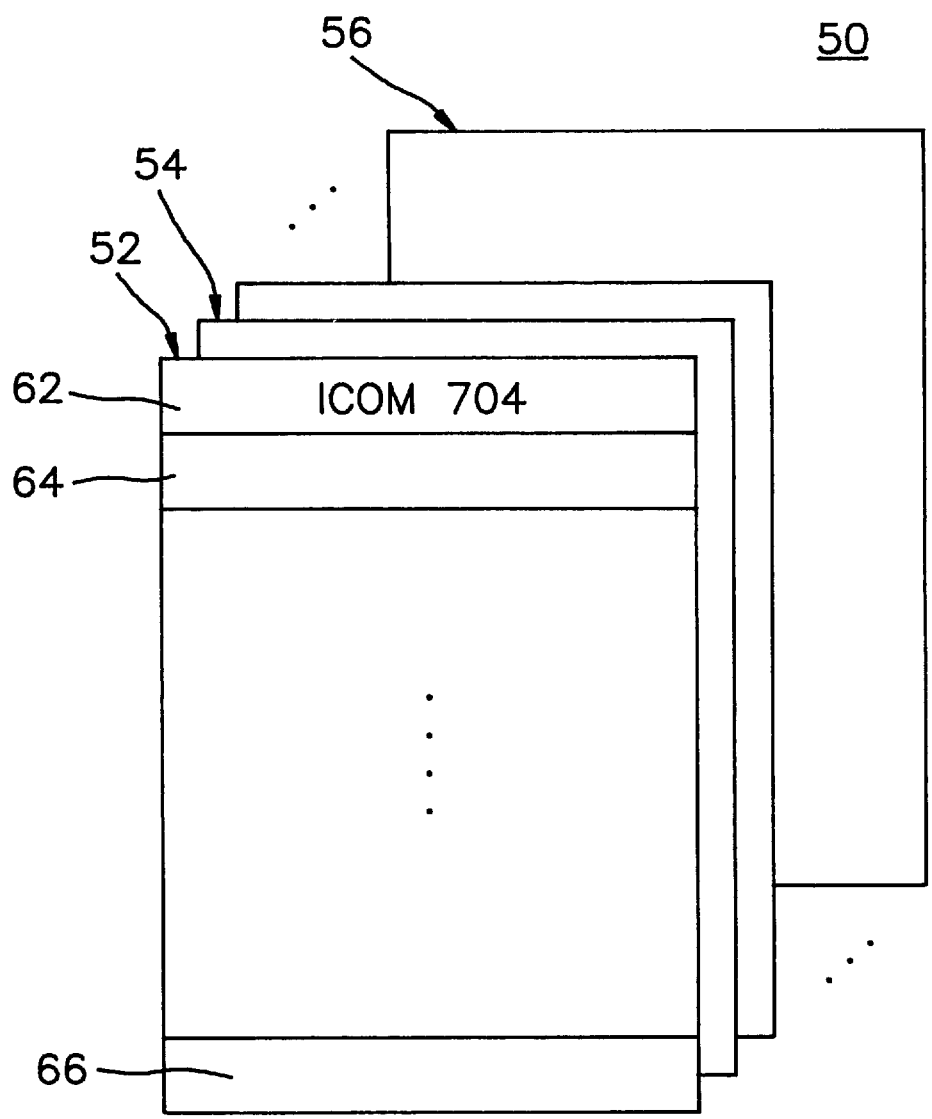

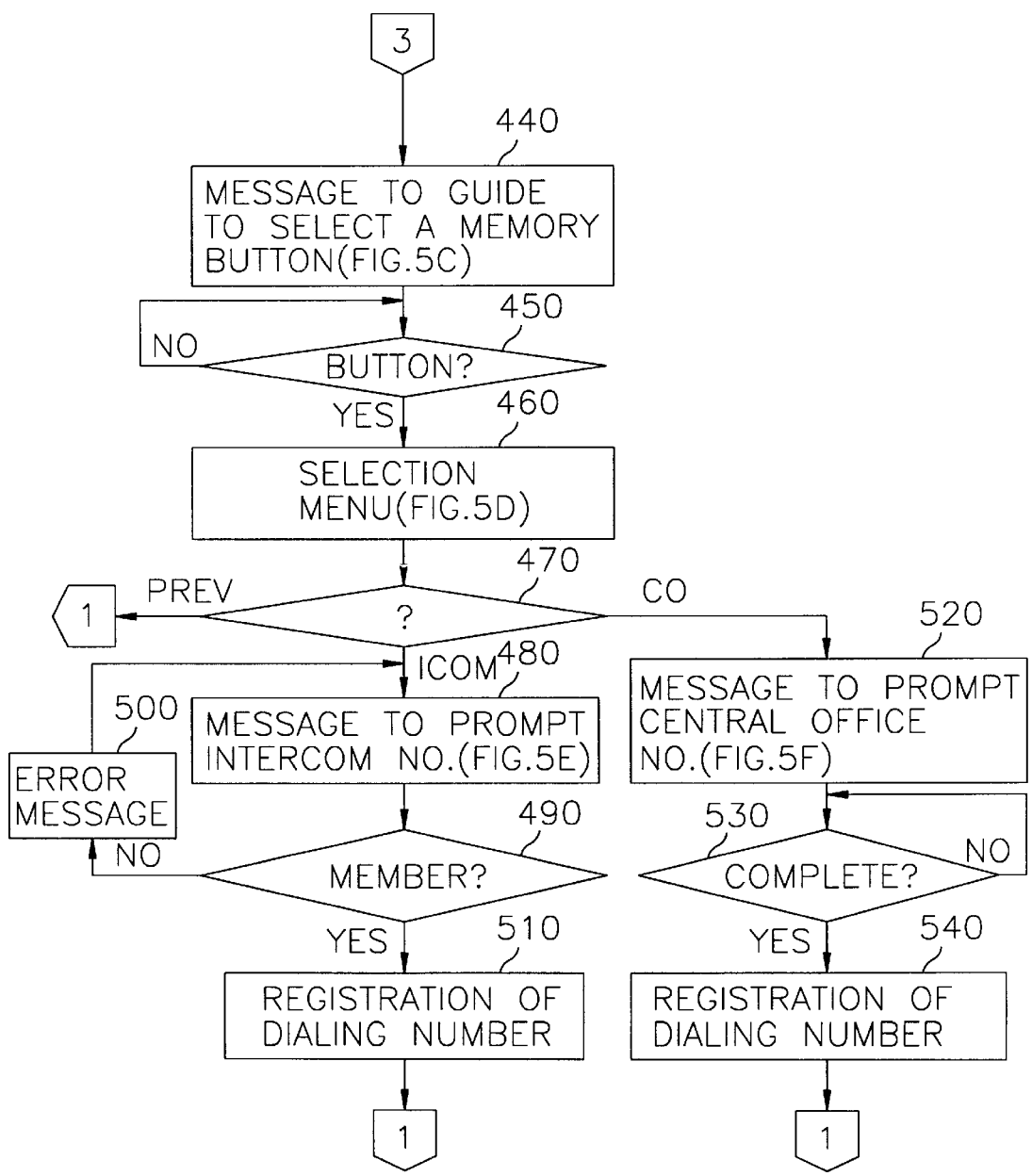

FIG.5A

SET:702 MEMORY COUNT:
DSP     NEXT      ADD

FIG.5B

NO1:ICOM-704
PREV    NEXT     DEL

FIG.5C

PRESS A BUTTON

FIG.5D

SELECT!          ICOM  CO
PREV

FIG.5E

MEMORY NO. :

FIG.5F

MEMORY NO.:
              BKS      OK

ONE-TOUCH DIALING APPARATUS AND METHOD FOR REGISTERING DIALING NUMBERS IN A TELEPHONE SYSTEM

FIELD OF THE INVENTION

The present invention relates to a telephone system having a plurality of telephones; and, more particularly, to a one-touch dialing apparatus and method for registering dialing numbers in the telephone system.

DESCRIPTION OF THE PRIOR ART

A private telephone system is frequently set up to handle telephone traffic in a business environment using a multiple number of telephones. One example of the private telephone systems is a keyphone system capable of handling up to 50 telephones. As is well known in the art, in such a keyphone system, each of the telephones is provided with a speed dialing capability, wherein to each of the telephones is assigned an individual extension or an intercom number having two or more digits shorter than a full phone number to differentiate one from another, thereby making a telephone accessible through the use of the individual intercom number without dialing its full phone number.

As for a more advanced idea, a special service called a one-touch dialing feature is offered to each of the telephones in the telephone system. The one-touch dialing feature stores frequently used dialing number such as an intercom number or customer's phone number into a memory unit in the telephone and assigns a stored dialing number to a memory button in the telephone. By using the one-touch dialing feature, a telephone user can make a call to another telephone user whose phone number or intercom number is stored in the system by simply pressing the corresponding memory button on his telephone.

The procedures for storing the numbers and assigning the buttons thereto may be repeated with respect to all the remaining telephones to make the one-touch dialing feature commonly available in each telephone. Alternatively, each telephone may be individually programmed to register its private one-touch dial information.

However, in a prior art keyphone system, each telephone has its own independent memory unit to register its one-touch dial information and therefore should be programmed individually. Therefore, a system manager responsible for the keyphone system should program at each of the telephones for the one-touch dial feature thereto.

SUMMARY OF THE INVENTION

It is, therefore, a primary object of the present invention to provide a one-touch dialing apparatus and method capable of registering dialing numbers in a telephone system.

In accordance with an embodiment of the present invention, there is provided a one-touch dialing apparatus for registering dialing numbers in a telephone system having a plurality of telephones, each of the telephones being identified by its intercom number and having a number of memory buttons, which comprises: memory means divided into a plurality of memory blocks each memory block having a number of memory locations, each memory location storing the information, wherein each of the memory blocks is arranged for each of the telephones; means, in response to an intercom number for a subject telephone generated from a source telephone, for selecting a memory block corresponding to the subject telephone having the intercom number; means for addressing each of the memory locations in the selected memory block; means for assigning each of the memory buttons to each of the addressed memory locations; and means for registering the information into the addressed memory location assigned to the memory button.

In accordance with a second embodiment of the present invention, there is provided a one-touch dialing method for registering dialing numbers in a telephone system having a number of telephones and memory means, wherein each telephone is identified by its intercom number and has a number of memory buttons and the memory means is divided into a plurality of memory blocks, each memory block having a multiplicity of memory locations and being associated with each of the corresponding telephones, which comprises the steps of: accessing to a source telephone; generating an intercom number for a subject telephone from the source telephone; in response to the intercom number, selecting a memory block corresponding to the subject telephone having the intercom number; addressing each of the memory locations in the selected memory block; assigning a memory button to the addressed memory location; and registering a dialing number into the addressed memory location assigned to the memory button.

BRIEF DESCRIPTION OF THE DRAWINGS

The above and other objects and features of the present invention will become apparent from the following description of preferred embodiments, when taken in conjunction with the accompanying drawings, in which:

FIG. 3 depicts a detailed diagram of the data memory shown in FIG. 1;

FIGS. 4A, 4B and 4C represent flow diagrams illustrating control processes in accordance with the present invention; and FIGS. 5A, 5B, 5C, 5D, 5E and 5F are a variety of messages generated during the registration, respectively.

DETAILED DESCRIPTION OF THE PREFERRED EMBODIMENTS

Figure 1:
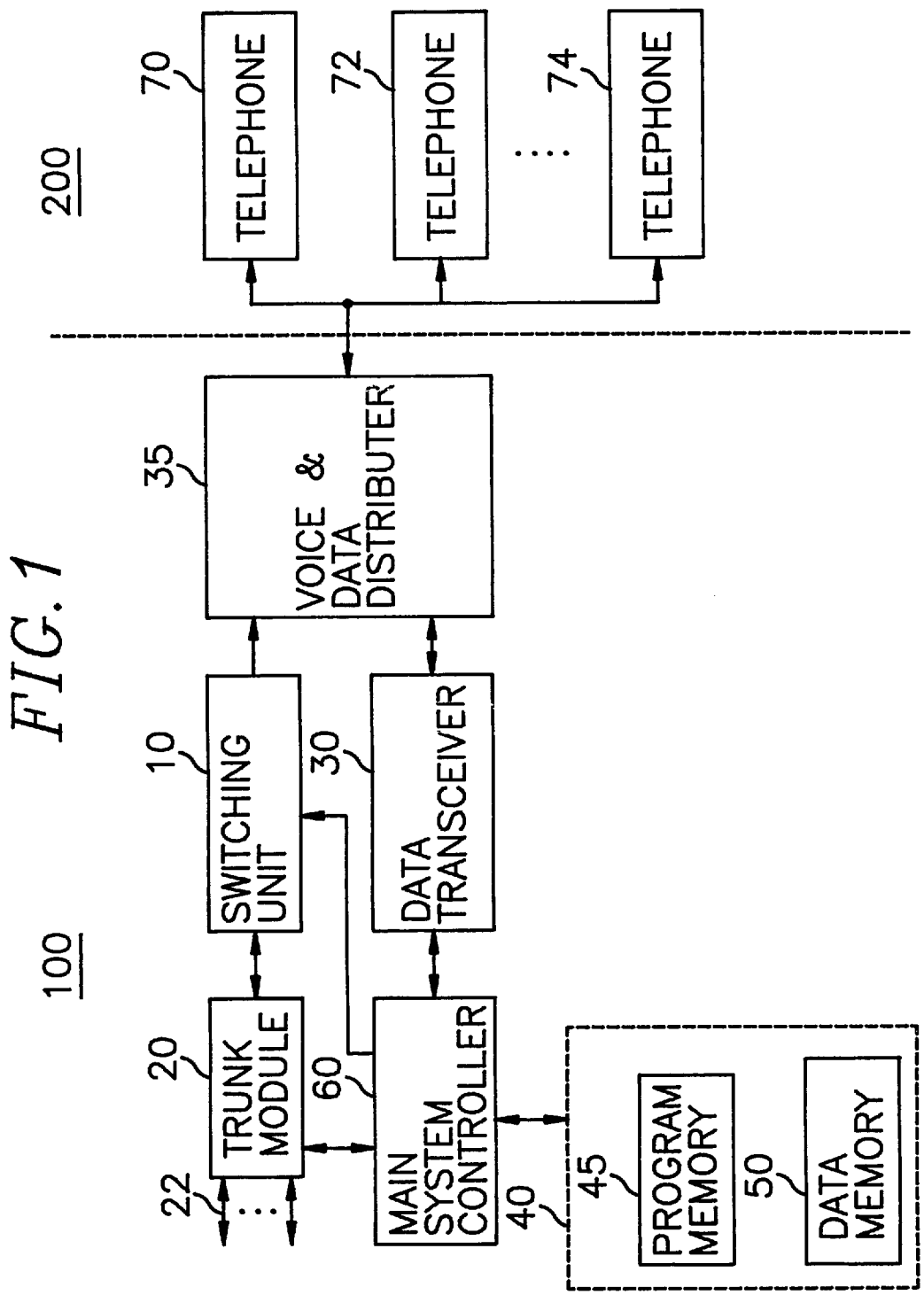
FIG. 1 shows a schematic block diagram of a keyphone system in accordance with a preferred embodiment of the present invention.

Referring to FIG. 1, there is shown a keyphone system including a main system 100 and a subsystem 200 having a plurality of telephones, e.g., 70, 72, 74, in accordance with an embodiment of the present invention.

The main system 100 comprises a switching unit 10, a trunk module 20, a data transceiver 30, a voice and data distributor 35, a memory section 40 and a main system controller 60. The switching unit 10 connects the telephones to each other via the voice and data distributor 35 or each telephone connected via the voice and data distributor 35 thereto to a subscriber on central office line 22 through the trunk module 20, wherein the voice and data distributor 35 selectively exchanges the voice and the data between the system controller 60 and the telephones or the central office and the telephones. The trunk module 20 interfaces the keyphone system to the central office line 22 so that a call via the central office line 22 is connected to a receiver, i.e., any one of the telephones in the subsystem 200 connected thereto via the switching system 10 and the voice and data distributer 35 and/or vice versa.

The data transceiver 30 is arranged to exchange information generated from the main system 100 and a variety of key input signals produced from the telephones, e.g., 70, 72, 74 in the subsystem 200 therebetween via the voice and data distributor 35.

As is well known in the art, to each of the telephones, e.g., 70, 72 or 74 are assigned a unique phone number and an individual intercom number, e.g., 700, 702 or 704, to identify each of them. In accordance with the present invention, an intercom number allows for a telephone user to conveniently connect from any one of the telephones, i.e., a source telephone, to a subject telephone having the intercom number in the subsystem 200.

Figure 2:
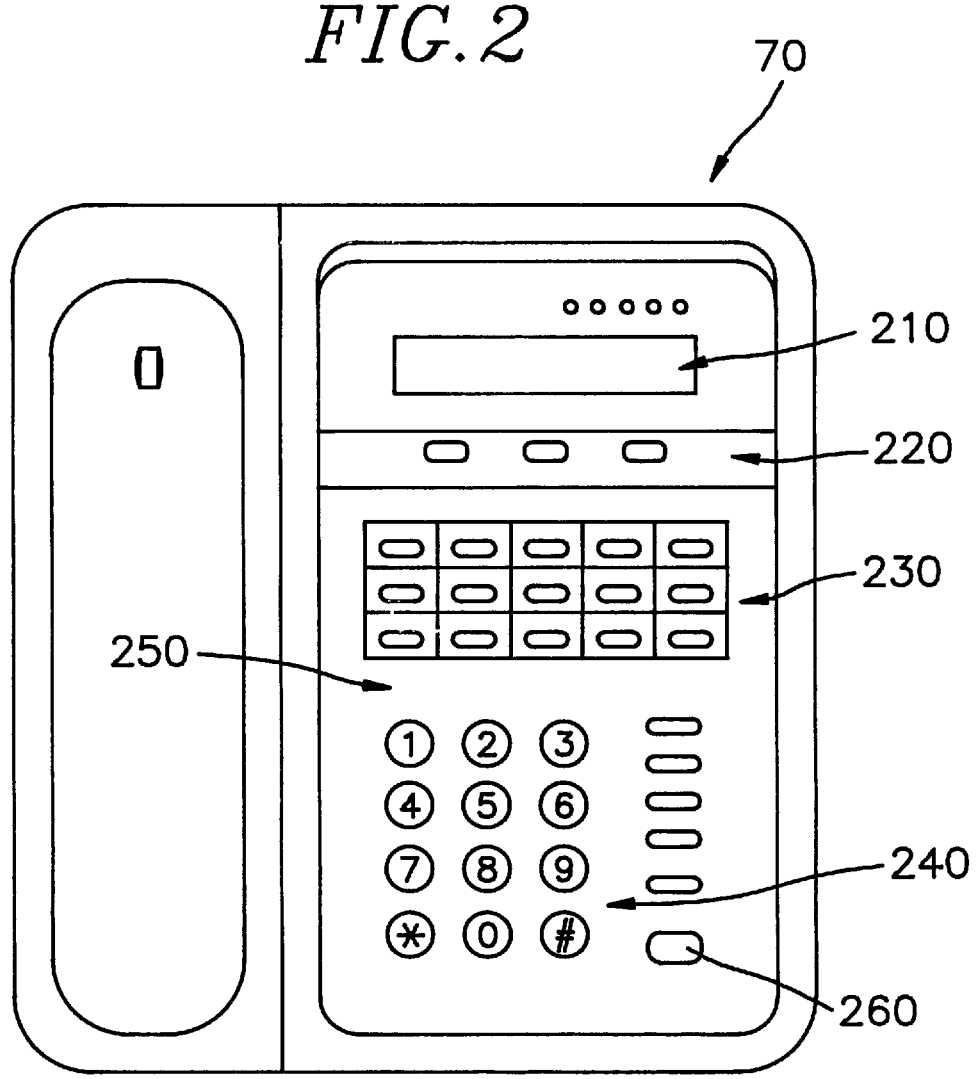
FIG. 2 illustrates a detailed block diagram of one of telephones shown in FIG. 1.

The structures of all the telephones are substantially identical to each other and there is shown in FIG. 2 a front view of a telephone, e.g., 70 in detail for the sake of illustration. The telephone 70 includes a liquid crystal display (LCD) 210, a panel 250 having a set of switchable buttons 220, a plurality of memory buttons 230, a set of numeral dial buttons 240, as well as a group of special purpose buttons such as speaker, hold, release buttons 260, etc. as illustrated in the right side of the numeral dial buttons 240.

The numeral button set 240 is used to generate the dialing numbers which is provided to the system controller 60 in the main system 100 for the registration thereof into the memory section 40. Each of the dialing numbers is assigned to each of the memory buttons to represent the dialing number. The LCD display 210 displays the dialing number stored in the memory section 40 under the control of the system controller 60.

The memory section 40 has a read only memory ("ROM") 45, wherein various programs including an inventive one-touch dial program are stored, and a data memory 50 for storing the dialing number including a subscriber or an intercom number that can be changed or updated during the operation of the system controller 60. The system controller 60, which may be implemented with a microcomputer, controls all the components in the keyphone system and communicates with each of the telephones in the subsystem 200 to register the dialing numbers into the data memory 50 and to retrieve, delete and update the dialing number stored in the data memory 50.

As best shown in FIG. 3, the data memory 50 is divided into a plurality of memory blocks, e.g. 52, 54, 56, which are associated with the telephones, e.g. 70, 72, 74, respectively. Each of the memory blocks 52, 54, 56 has a number of memory locations, e.g. 62, 64, 66, each location storing the dialing number, e.g., a subscriber number or an intercom number of the keyphone system. The data memory may be implemented with a random access memory ("RAM") with battery backed up or alternatively, a non-voltaic memory such as an EEPROM.

In accordance with the present invention, each memory block associated with each telephone is identified by its corresponding intercom number. Accordingly, when an intercom number for a subject telephone is provided from a source telephone to the system controller 60, the system controller 60 selects a memory block associated with the intercom number. And then, a dialing number provided from the source telephone is registered into the memory block and the registered dialing number is retrieved, deleted or updated in accordance with the invention as discussed below.

Figure 4A:
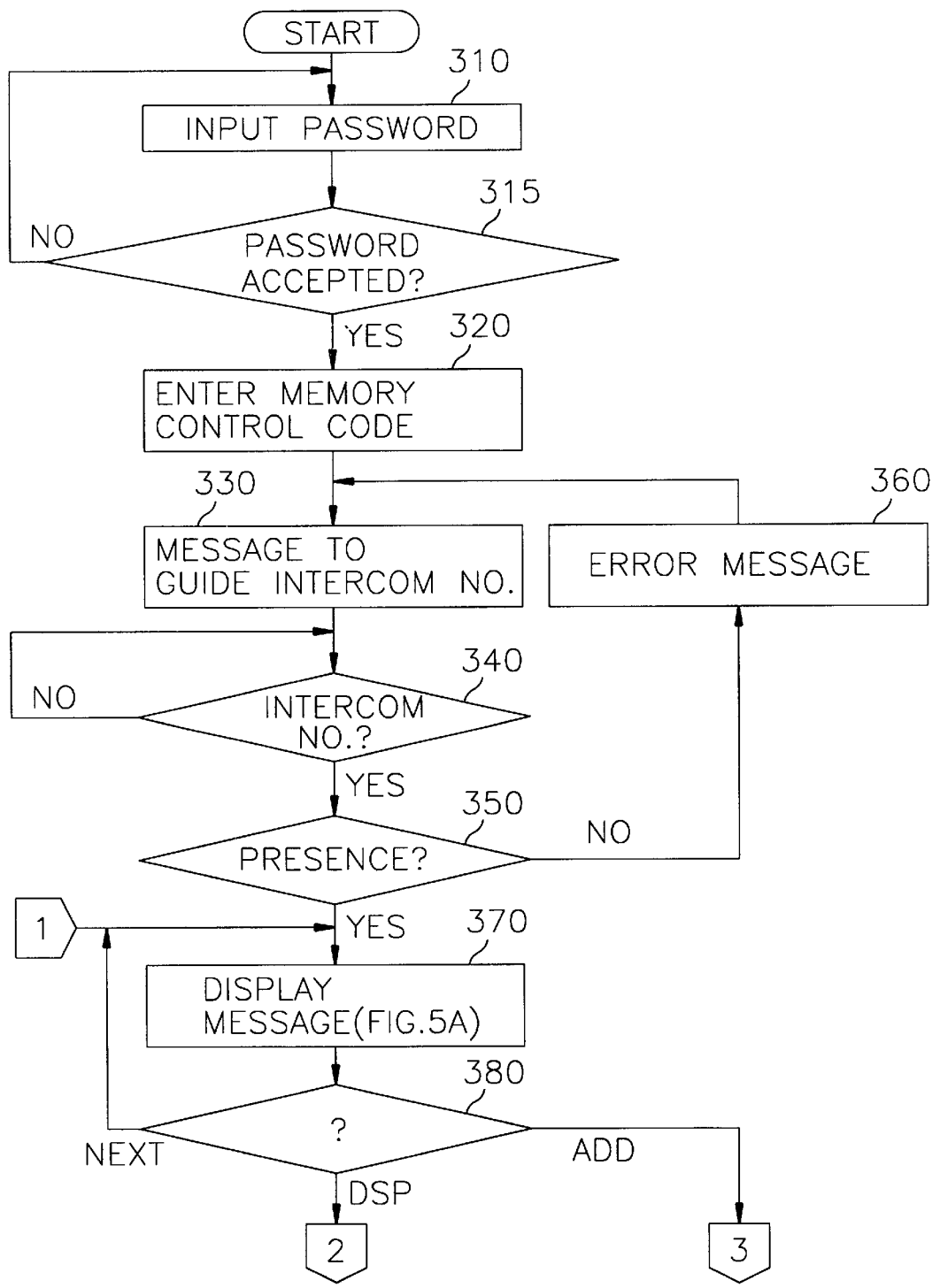
Figure 4B:
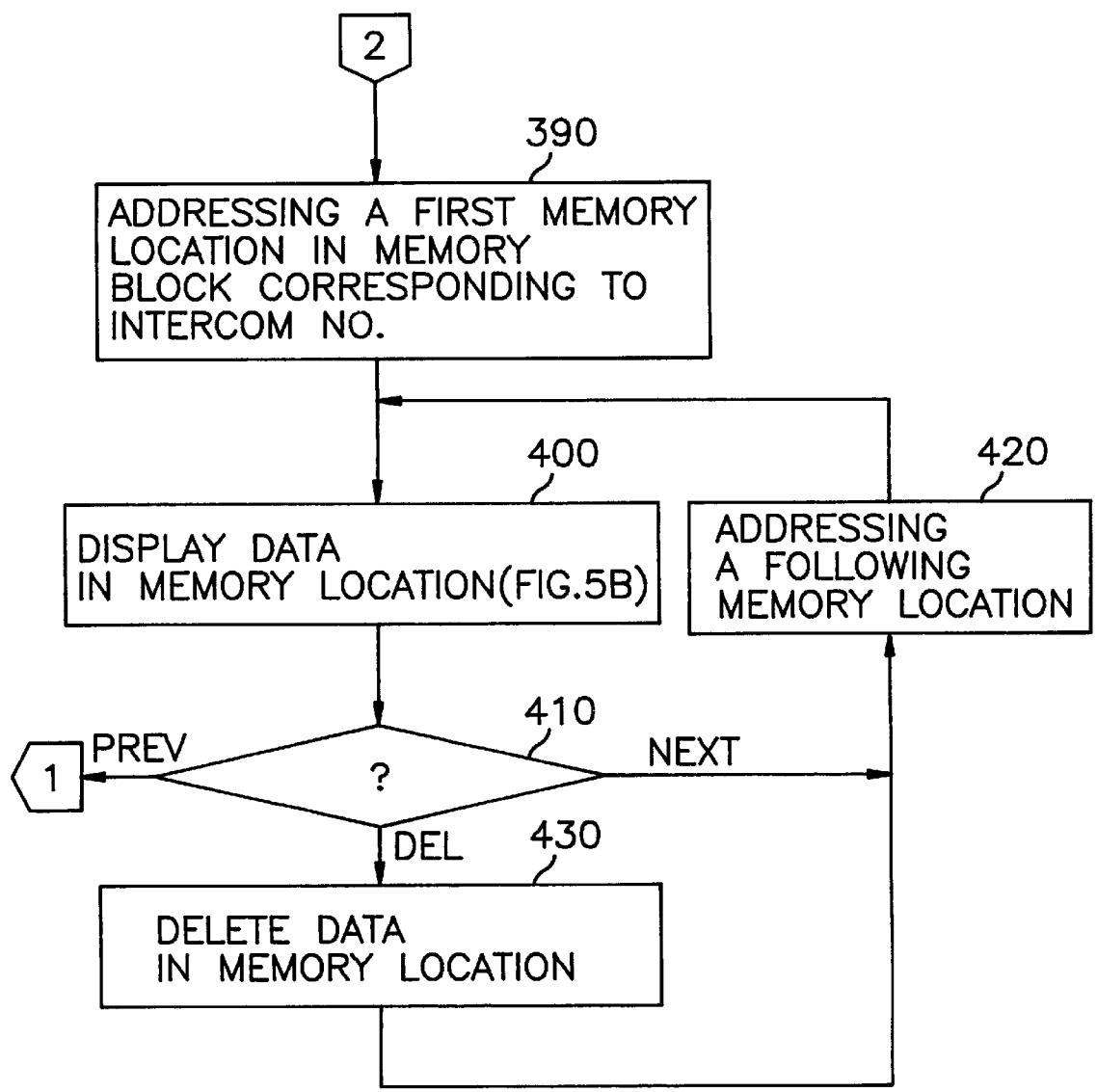

Referring now to FIGS. 4A, 4B and 4C, there is illustrated a control process for executing the dialing number registration in accordance with the present invention.

At a step 310, the system manager accessible to any one of the telephones inputs a password to have an access to the system through the numeral dial buttons 240 on a source telephone, e.g. 70, which is selected from the telephones.

If, at step 315, the password is accepted by the main system controller 60, an entry of a memory control code to initiate the data registration process is prompted on the LCD display 210 at a step 320.

After entering a memory control code, in a step 330, a message is displayed, requesting an intercom number for a target telephone, which is one of the remaining telephones, to be communicated with the source telephone. If the entry of the intercom number is confirmed by the system controller 60 as in steps 340 and 350, respectively, the control process proceeds to a subsequent step 370; otherwise, the control process returns to the step 330 through a step 360, wherein an error message indicating the absence of the intercom number is displayed on the LCD display 210.

In the step 370, the system controller 60 makes an access to a memory block, e.g., 52, for the subject telephone having the intercom number and displays a message on the LCD display 210 as shown in FIG. 5A. In FIG. 5A, a first line illustrates the intercom number, e.g., 7-0-2, for the subject telephone and an indicator MEMORY COUNT indicating the number of dialing data stored in the memory block 52; and a second line denotes a selection menu having a set of indicators DSP, NEXT and ADD, which will be selected by a set of the switchable buttons 220 on the panel 250. DSP is used to inquire for the system controller 60 to display the content in the memory block; NEXT is used to change the subject telephone to another; and ADD is used to store the dialing data to be registered into the memory block 52.

In connection with the message in FIG. 5A, in the step 380, if the system manager presses a first switchable button directly below the indicator DSP, the control process goes to a step 390 for reviewing the memory content; if the system manager presses a second switchable button directly below the indicator NEXT, the control process returns to the step 370 to repeat the memory block accessing step with respect to a next telephone; and if the system manager presses a third switchable button directly below the indicator ADD, the control process goes to a step 440 for performing the addition procedure.

In the step 390, in response to the DSP request in the step 380, a retriever in the system controller 60 addresses a first memory location 62 in the memory block 52, which is assigned to a first memory button among the memory buttons in the subject telephone; and, in a subsequent step 400, the dialing data stored in the first memory location is retrieved therefrom and is displayed on the LCD display 210.

Alternatively, in the step 390, the present invention can be programmed to directly press any one of the memory buttons in order to retrieve the dialing data stored in a memory location assigned to the pressed memory button. In this connection, a message will be designed to display "PRESS A MEMORY BUTTON".

FIG. 5B depicts an exemplary display resulting from the execution of the step 400, wherein a first line denotes that the first memory button is assigned to call a telephone having an intercom number "704", the intercom number being indicated by an indicator "ICOM". Further, displayed in a second line is a set of selection indicators of PREV, NEXT and DEL which define a previous display, a next memory content, and deleting a memory content, respectively; and the selections of the options and the following operations thereof will be performed in a subsequent step 410 through the use of the set of switchable buttons 220 as similar fashion as described in connection with the step 380.

Accordingly, in the selection step 410, if the system manager presses a first switchable button directly below the indicator PREV, the control process returns to the step 370 for reviewing the display as shown in FIG. 5A; if the system manager presses a second switchable button directly below the indicator NEXT, the control process passes to the step 420 and then the step 400 for continuing the retrieval of the content stored in a next memory location; and if the system manager presses a third switchable button directly below the indicator DEL, the control process goes to a step 430 for deleting the content stored in the memory location.

On the other hand, in the step 440, the system manager can assign a memory button to represent a dialing number stored in a memory location addressed in the step 370, in accordance with a message "PRESS A MEMORY BUTTON" as represented in FIG. 5C.

In a step 450, if any one of the memory buttons is selected for an assignment thereof, the selected memory button will be used to address the memory location assigned thereto. And then, the control process advances to a step 460 where the main system controller 60 inquires how to use the selected memory button, for example, for an intercom "ICOM" or for a central office "CO" as shown in FIG. 5D, wherein the indicator PREV denotes a comeback to a previous scene as discussed in the step 370.

Accordingly, in a selection step 470, if the system manager presses a first switchable button directly below the indicator PREV, the control process returns to the step 370; if he presses a second switchable button directly below the indicator ICOM, the control process passes to a step 480 for requesting an entry of a desired intercom number for the registration thereof; and if he presses a third switchable button directly below the indicator CO, the control process goes to a step 520 for requesting an entry of a desired subscriber number for the registration thereof. FIG. 5E illustrates a display which is generated from the step 480 wherein a message "MEMORY No:" is displayed to prompt the entry of the intercom number next thereto for the registration thereof.

Thereafter, in a step 490, it is tested whether the intercom number is one of the intercom numbers in the telephone system. If the test result is negative, i.e., if the intercom number is not a member of the intercom numbers, the control process returns to the step 480, through a step 500 leaving an error message requiring a correct number. However, if the test result is positive, the control process advances to a step 510, wherein the system controller 60 stores the dialing data and its associated indicator, ICOM.

Similarly, in a step 530, a message "MEMORY No:" is displayed to prompt the entry of the subscriber number for the registration thereof as shown in FIG. 5F. Thereafter, the completion of the entry of the subscriber number and the correction thereof are achieved by way of pressing switchable buttons directly below indicators OK and BKS, respectively, as shown in FIG. 5F. The indicator BKS serves to delete the digits of the entered subscriber number appearing next to the indicator "MEMORY No:" one-by-one. If the entry is successfully made, the control process proceeds to a step 540, wherein the system controller 60 stores the dialing number and its associated indicator, CO; and then returns to the step 370 as described above.

In accordance with the present invention, at the end of the above procedure or during the above procedure, the system manager can complete his action by way of pressing the release button 260 on the source telephone at any time.

While the present invention has been shown and described with respect to the preferred embodiments, it will be apparent to those skilled in the art that many changes and modifications may be made without departing from the spirit and scope of the invention as defined in the appended claims.

What is claimed is:

1. A one-touch dialing apparatus for registering dialing numbers in a telephone system having a plurality of telephones, each of the telephones being identified by an intercom number and having a number of memory buttons, the apparatus comprising:

memory means divided into a plurality of memory blocks, each memory block having a number of memory locations, each memory location for storing a dialing number, wherein each of the memory blocks is associated with a corresponding one of the telephones and is directly indexed by said corresponding telephone's intercom number;

means for prompting a source telephone for an intercom number for a subject telephone;

means, in response to receiving an intercom number for a subject telephone generated from the source telephone, for selecting a memory block corresponding to the subject telephone having the intercom number;

means for addressing sequentially each of the memory locations in the selected memory block;

means for assigning each of the memory buttons to a corresponding one of the addressed memory locations; and means for registering a dialing number into an addressed memory location assigned to one of the memory buttons.

2. The apparatus of claim 1, further comprising means for retrieving the dialing number registered in the memory location.

3. The apparatus of claim 1, further comprising means for updating the dialing number registered in the memory location.

4. The apparatus of claim 1, wherein the dialing number includes a subscriber phone number and an intercom number.

5. The apparatus of claim 1, wherein the source telephone is one selected from the telephones and the subject telephone is one of the remaining telephones.

6. A one-touch dial method for registering dialing numbers in a telephone system having a number of telephones and memory means, wherein each telephone is identified by an intercom number and has a number of memory buttons and the memory means is divided into a plurality of memory blocks, each memory block having a multiplicity of memory locations and being associated with a corresponding one of the telephones and being directly indexed by that telephone's intercom number, the method comprising the steps of:

prompting a source telephone for an intercom number for a subject telephone;

generating an intercom number for a subject telephone from the source telephone;

in response to receiving the intercom number, selecting the memory block corresponding to the subject telephone having the intercom number;

addressing sequentially each of the memory locations in the selected memory block;

assigning each of the memory buttons to a corresponding one of the addressed memory locations; and registering a dialing number into an addressed memory location assigned to one of the memory buttons.

7. The method of claim 6, further comprising the step of retrieving the dialing number registered in the memory location.

8. The method of claim 6, further comprising the step of updating the dialing number registered in the memory location.

9. The method of claim 6, wherein the dialing number includes a subscriber number and an intercom number.

10. The method of claim 6, wherein the source telephone is one selected from the telephones and the subject telephone is one of the remaining telephones.

11. The method of claim 6, further comprising the step of requiring a password to have an access to the system.

12. A one-touch dialing apparatus for registering dialing numbers in a telephone system having a plurality of telephones, each of the telephones having a number of memory buttons, the apparatus comprising:

memory means divided into a plurality of memory blocks, each of memory blocks having a number of memory locations, each of the memory locations for storing a dialing number, wherein each of the memory blocks is directly indexed by a phone number assigned to one of the telephones;

means for prompting a source telephone for the phone number;

input means for entering the phone number and the dialing number;

means for accessing the memory block directly indexed by said phone number;

means for assigning one of the memory buttons of the telephone corresponding to said phone number to one of the memory locations of said memory block; and means for registering the dialing number into said one of the memory locations.

13. The apparatus of claim 12, further comprising means for retrieving the dialing number stored at each of the memory locations.

14. The apparatus of claim 13, wherein the input means is one of said plurality of telephones.

15. The apparatus of claim 12, further comprising:

means for updating the dialing number stored at each of the memory locations.

16. The apparatus of claim 12, wherein the phone number is an intercom number used in the telephone system to identify one of the telephones.

\* \* \* \* \*